(12) United States Patent
Polak

(10) Patent No.: US 11,115,575 B2
(45) Date of Patent: Sep. 7, 2021

(54) CAMERA WITH 2-COMPONENT ELEMENT

(71) Applicant: Aptiv Technologies Limited, St. Michael (BB)

(72) Inventor: Andrzej Polak, Huerth (DE)

(73) Assignee: Aptiv Technologies Limited, St. Michael (BB)

( * ) Notice: Subject to any disclaimer, the term of this patent is extended or adjusted under 35 U.S.C. 154(b) by 2 days.

(21) Appl. No.: 16/458,503

(22) Filed: Jul. 1, 2019

(65) Prior Publication Data

US 2020/0029002 A1    Jan. 23, 2020

(30) Foreign Application Priority Data

Jul. 23, 2018  (EP) ..................................... 18185056

(51) Int. Cl.
*H04N 5/225*    (2006.01)
*B60R 1/00*    (2006.01)
(Continued)

(52) U.S. Cl.
CPC ............. *H04N 5/2256* (2013.01); *B60R 1/00* (2013.01); *B60R 2001/1253* (2013.01); *G06K 9/00845* (2013.01)

(58) Field of Classification Search
CPC .. H04N 5/2256; H04N 5/2251; H04N 5/2254; H04N 5/2253; H04N 5/2257; H04N 5/2352; H04N 5/2351; H04N 5/23245; H04N 5/23209; H04N 5/2354; H04N 5/243; H04N 5/2353; H04N 5/235; H04N 5/2358; H04N 2201/3252; B60R 1/00;
(Continued)

(56) References Cited

U.S. PATENT DOCUMENTS 6,033,087 A * 3/2000 Shozo ...................... F21V 5/04
362/244
7,638,808 B2 * 12/2009 Owen ..................... H01L 33/60
257/88
(Continued)

FOREIGN PATENT DOCUMENTS

CN          1404630        3/2003
CN        101029950        9/2007
(Continued)

OTHER PUBLICATIONS

Akyso S et al: "Gegensteuerung für Fahrzeugbordsysteme", Informatik Aktu, Springer Verlag, London, GB Jan. 1, 2000, XP009091473, ISSN: 1431-472X.
(Continued)

*Primary Examiner* — Abdelaaziz Tissire
(74) *Attorney, Agent, or Firm* — Colby Nipper PLLC

(57) ABSTRACT

Device for acquiring images inside a vehicle, comprising an illuminator to illuminate a field of view, an image sensor that is arranged to acquire images from the field of view, and an optical element having a light-transparent portion and a light-blocking portion, wherein the light-transparent portion is arranged so that light of the illuminator being emitted to the field of view passes through the light-transparent portion, and wherein the light-blocking portion is arranged to block light of the illuminator being emitted in a direction towards the image sensor.

19 Claims, 8 Drawing Sheets

(51) Int. Cl.
  *B60R 1/12* (2006.01)
  *G06K 9/00* (2006.01)
(58) Field of Classification Search
  CPC ............ B60R 2001/1253; B60R 16/02; G06K
       9/00845; G06K 2009/401; G06K 9/2027;
       B60Q 3/70; G03B 15/02–05; F21K
       5/023; F21K 5/026
  See application file for complete search history.

(56) References Cited

U.S. PATENT DOCUMENTS

| | | | | |
|---|---|---|---|---|
| 8,434,918 | B2* | 5/2013 | Lee ........................ | F21V 5/10 362/431 |
| 8,491,157 | B2* | 7/2013 | Oba ...................... | H05B 45/46 362/268 |
| 9,086,318 | B1* | 7/2015 | Baldwin .................. | G01J 1/04 |
| 10,458,624 | B2* | 10/2019 | Dross ..................... | F21V 5/007 |
| 2002/0080615 | A1* | 6/2002 | Marshall ................. | G02B 3/00 362/333 |
| 2005/0218468 | A1* | 10/2005 | Owen ..................... | H01L 33/60 257/433 |
| 2005/0275748 | A1* | 12/2005 | Takekuma ........... | H04N 5/2256 348/370 |
| 2006/0039141 | A1* | 2/2006 | Thrailkill ........... | G01N 21/8806 362/227 |
| 2007/0206391 | A1* | 9/2007 | Matsuo ................ | G06K 9/2027 362/558 |
| 2009/0140630 | A1* | 6/2009 | Kijima ............... | C09K 11/7774 313/498 |
| 2010/0321497 | A1* | 12/2010 | Onishi ..................... | B60R 1/10 348/148 |
| 2013/0120242 | A1* | 5/2013 | Takakura .............. | G06F 3/0304 345/156 |
| 2013/0135513 | A1* | 5/2013 | Choi ........................ | A61B 3/14 348/335 |
| 2013/0223071 | A1* | 8/2013 | Nishimori ............... | F21S 2/005 362/244 |
| 2016/0044215 | A1 | 2/2016 | Tsujikawa et al. | |
| 2016/0091777 | A1* | 3/2016 | Kuan ..................... | G03B 15/03 362/16 |

FOREIGN PATENT DOCUMENTS

| | | |
|---|---|---|
| EP | 1 830 123 A1 | 9/2007 |
| EP | 2048628 | 4/2009 |
| FR | 3 048 111 A1 | 8/2017 |
| JP | 2011184030 | 9/2011 |
| WO | 2014196044 | 12/2014 |

OTHER PUBLICATIONS

"Foreign Office Action", EP Application No. 18185056.1, dated Sep. 8, 2020, 5 pages.
"Foreign Office Action", CN Application No. 201910660442.1, dated Sep. 23, 2020, 19 pages.
"Foreign Office Action", EP Application No. 18185056.1, dated Feb. 3, 2021, 5 pages.
"Foreign Office Action", CN Application No. 201910660442.1, dated Apr. 25, 2021, 17 pages.

* cited by examiner

CAMERA WITH 2-COMPONENT ELEMENT

CROSS-REFERENCE TO RELATED APPLICATION

This application claims the benefit under 35 U.S.C. § 119(a) of European Patent Application EP 18185056, filed 23 Jul. 2018, the entire disclosure of which is hereby incorporated herein by reference.

TECHNICAL FIELD

This disclosure generally relates to a device for acquiring images inside a vehicle, in particular for gesture recognition and/or fatigue detection.

SUMMARY

A device for acquiring images inside a vehicle can be designed as an integrated component, i.e. it is integrated into the installation space of the vehicle, e.g. into the dashboard or the roof. The installation space of vehicles is usually very limited so that there is a need for a device for acquiring images inside a vehicle with a compact design.

Described herein are techniques to provide a device for acquiring images inside a vehicle with a compact design.

The device comprises an illuminator to illuminate a field of view. The field of view is usually defined as a space where the driver's head is located when he or she is driving the vehicle. The device further comprises an image sensor that is arranged to acquire images from the field of view. If the field of view is defined as a space in which the driver's head is located, the image sensor can acquire images from the drivers head. Further, the device comprises an optical element having a light-transparent portion and a light-blocking portion, wherein the light-transparent portion is arranged so that light of the illuminator being emitted to the field of view passes through the light-transparent portion, and wherein the light-blocking portion is arranged to block light of the illuminator being emitted in a direction towards the image sensor.

One general idea of the invention is to provide one optical element that has different optical properties in different portions. This optical element is one single prefabricated part, for example manufactured by a multi-component injection molding process.

The optical element according to the invention has two separate functions: letting light of the illuminator pass through its light-transparent portion to the field of view and blocking light of the illuminator travelling to the sensor to avoid so called light leaks.

In the present teaching, the light emitted by the illuminator may generally be visible to the human eye, but preferably comprises or essentially consists of light that is not visible to the human eye, for example electromagnetic radiation in the form of infrared light.

Advantageous embodiments of the device for acquiring images inside a vehicle can be taken from the following description, the dependent claims and the drawings.

In accordance with an embodiment, the light-transparent portion forms at least one lens. The light-transparent portion can form precisely one lens. Alternatively, the light-transparent portion can form more than one lens. This has the advantage that the optical element can be used to modify the illumination of the field of view. The illumination should generally be modified to be uniform throughout the field of view and the least possible outside the field of view.

In the present teaching, the term light-transparent generally means, that at least light of a certain wavelength-range can pass through the material.

According to one aspect, the light-transparent portion is configured to not block any light, i.e. let light of any wavelength pass through itself. Alternatively, the light-transparent portion is configured to only let light of a certain wavelength-range pass through. In one embodiment, the light-transparent portion is configured to essentially only let infrared light pass through. This has the advantage that a so called red glow effect is minimized.

In another aspect, the light-transparent portion is configured to at least let infrared light pass through, i.e. the part is infrared-light transparent. Therefore, infrared light can be used to illuminate the field of view.

According to a further aspect, the illuminator is arranged to emit light in an infrared-range wavelength. The illuminator can be arranged to emit light near-infrared light, in particular in a range from 780 nm to 1100 nm. The advantage of using light in the infrared-range wavelength to illuminate the field of view is that the driver cannot see the light and thus is not dazzled by the light.

In an aspect of the invention, the illuminator comprises at least one laser and/or at least one light emitting diode. The illuminator can comprise precisely one laser or one LED. Alternatively, the illuminator can comprise multiple lasers or LEDs which particularly can be arranged in a matrix.

The at least one LED of the illuminator can be an SMD LED or a chip on board LED. The at least one laser can be a vertical-cavity surface-emitting laser (VCSEL).

According to an aspect, the illuminator comprises a light source that is encapsulated by the light-transparent portion. The term "encapsulated by the light-transparent portion" means that the light-transparent portion encompasses the light source so that the light source is sealed either completely by the light-transparent portion or by the light transparent portion in combination with other parts of the device.

According to another embodiment, the device does not comprise a separate reflector part. For example, the light-transparent portion can have a reflective coating that renders a separate reflector part unnecessary. The advantage of not having a separate reflector part is that the device can be made in a particularly compact design.

In order to improve the illumination of the field of view, an LED with a built-in lens can be used. In addition, the light-transparent portion can be formed as a lens. In one embodiment, the built-in lens and the lens formed by the light-transparent portion are optically connected in series so that the light of the illuminator passes both lenses. This helps to provide an even illumination of the field of view.

The light source can comprise at least one LED and/or at least one laser that are fixed to a printed circuit board (PCB). The PCB and the light-transparent portion can enclose the light source to seal the light source. In order to avoid losing the sealing properties over the product life-cycle the light-transparent portion can be fixedly connected to the printed circuit board, e.g. glued to the printed circuit board. This also limits noise caused by vibrations of the PCB.

According to one embodiment, the light-transparent portion comprises, in particular is made of, an elastic material. Alternatively the light-blocking portion can comprise, in particular can be made of, an elastic material. Preferably, both the light-transparent portion and the light-blocking portion both comprise, in particular are both made of, an elastic material. Using an elastic material for the light-transparent portion and/or the light-blocking portion helps to avoid noise in the device and additionally helps to improve sealing of the device.

Alternatively, the light-transparent portion and the light-blocking portion can be made of an inelastic material such as a thermoplastic material.

According to one aspect, the light-transparent portion comprises silicon rubber and particularly consists of silicon rubber. Alternatively, the light-blocking portion can comprise silicon rubber and particularly consist of silicon rubber. In a preferred embodiment, the light-transparent portion and the light-blocking portion both comprise silicon rubber. Preferably, both the light-transparent portion and the light-blocking portion consist of silicon rubber. Silicon rubber can be used to manufacture complex geometries and has good damping and sealing properties. Therefore, it is well suited for manufacturing the light-transparent portion and/or the light-blocking portion.

According to one aspect, the light-transparent portion comprises a convex surface facing a light source of the illuminator. According to another aspect, the light-transparent portion defines an inner space having an undercut, i.e. the light-transparent portion defines a space with an inner circumference that increases towards the inside. In particular, the light-transparent portion is formed to comprise an opening with an inner circumference that is smaller than the inner circumference of the adjacent space inside the portion.

In another aspect, the surface of the light-transparent portion is at least partially coated. In particular, the coating can be an anti-reflective coating. The anti-reflective coating can be placed on the surface that faces towards the light source and/or the field of view. Alternatively or additionally the coating can comprise a reflective coating. The reflective coating can be used to replace a reflector part as mentioned before. In this case, the reflective coating can be placed on side-surfaces of the light-transparent portion, i.e. the surfaces that do not face towards the light source or the field of view. As an example, the reflective coating can comprise metal.

In one aspect, the light-transparent portion has a light-entering surface with diffusing properties, a light-exiting surface with diffusing properties and/or comprises a material having light diffusing properties.

According to another aspect, the light-transparent portion comprises microlenses and/or a structure is formed on the surface of the light-transparent portion. Examples of a structure on the surface of the light-transparent portion can be refractive microlenses, beam homogenizers, and collimators. Such a structure can be placed on the surface that faces towards the light source and/or the surface that faces the field of view. The structure can also be placed inside the body of the light-transparent portion.

In one embodiment, the illuminator comprises a reflector that is provided to deflect the light of a light source in the direction of the field of view. In particular, the reflector abuts the light-transparent portion and/or the light-blocking portion. The reflector can even be fixedly connected to the light-transparent portion and/or the light-blocking portion. When the reflector abuts the light-transparent portion or the light-blocking portion, vibrations of the reflector initiated by frequent illumination causing noise are being eliminated. This is especially the case when the light-transparent portion and/or the light-blocking portion are made from an elastic material such as silicon rubber.

The reflector can be at least partially made from a metallic or metalized material. For example, the reflector can be made from a material comprising copper and/or aluminum.

According to an embodiment, the reflector and the light-blocking portion abut or touch each other to form a sealing surface. This helps sealing the inside of the reflector. In particular the sealing surface between the reflector and the light-blocking portion extends along a closed shape, e.g. a closed circle or a square.

To improve sealing of the inside of the reflector, the reflector and the light-transparent portion can abut each other to form a sealing surface. Particularly, the sealing surface between the reflector and the light-transparent portion can extend along a closed shape.

The illuminator can comprise a printed circuit board. In this case, in order to improve sealing between the printed circuit board and the light-transparent portion, the light-transparent portion and the printed circuit board can abut or touch each other to form a sealing surface. It can be favorable if the sealing surface between the light-transparent portion and the printed circuit board extends along a closed shape.

According to another aspect, a cover is provided at the front face of the device. The cover is impermeable to visible light, i.e. it is configured to filter at least a majority of the visible light that would otherwise enter or exit the device. Thus, the cover may appear black or dark colored to a person.

In a further embodiment, the light-blocking portion and the cover abut each other to form a sealing surface. Also the sealing surface between the light-blocking portion and the cover can extend along a closed shape, e.g. a square or a circle. In particular, a sealing lip can be formed on the light-blocking portion that is in contact with the cover. A second sealing lip can be formed on the light-blocking portion that is in contact with a housing of the device.

According to another aspect, the light-blocking portion forms a frame through which the light of the light source emits light to the field of view. Therefore, the light-blocking portion forms an opening though which the light passes into the field of view. The light-blocking portion thus is used to define a shape of the light beam of the illuminator. Additionally or alternatively, the light-blocking portion and the light-transparent portion can form a connection zone, i.e. a connecting surface where the two parts are connected to each other, that extends along a closed shape.

Further features and advantages will appear more clearly on a reading of the following detailed description of the preferred embodiment, which is given by way of non-limiting example only and with reference to the accompanying drawings.

BRIEF DESCRIPTION OF DRAWINGS

The features and advantages of the various embodiments of the present invention will, in the following, be described with reference to the figures.

DETAILED DESCRIPTION

Figure 1:
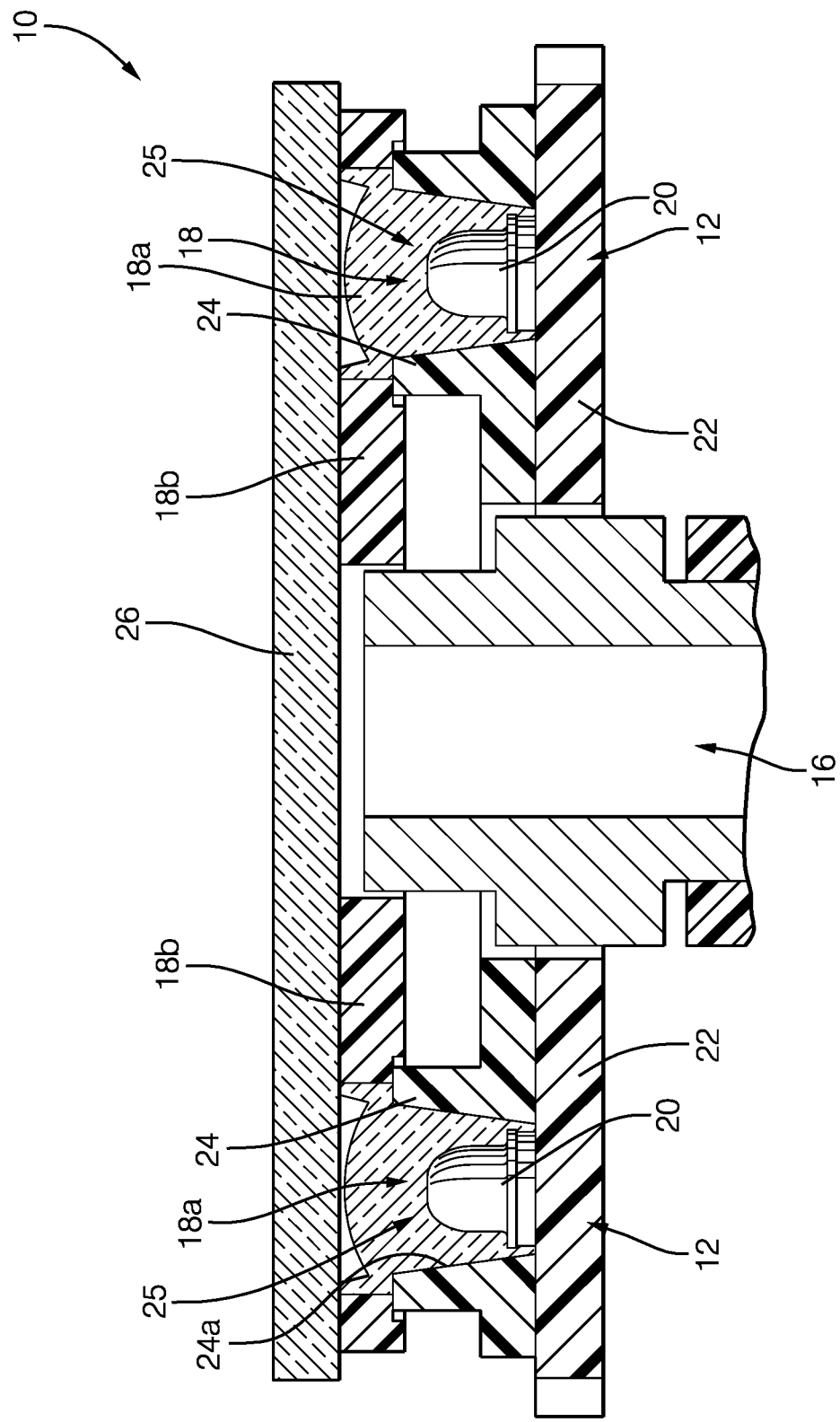
FIG. 1 shows a schematic cross sectional view of a device according to an embodiment of the present invention having a reflector.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

FIGS. 1 to 11 depict embodiments according to the invention. The same or corresponding components are labeled with the same reference signs to simplify comparison of the several embodiments.

FIG. 1 depicts a device 10 for acquiring images inside a vehicle, in particular for gesture recognition and/or fatigue detection. The device 10 can be integrated into a dashboard or a roof of a vehicle (not shown). The device 10 for acquiring images inside a vehicle comprises two illuminators 12 to illuminate a field of view 14, an image sensor 16 that is arranged to acquire images from the field of view 14, and an optical element 18 having light-transparent portions 18a and light-blocking portions 18b. The light-transparent portions 18a are arranged so that light of the illuminator 12 being emitted to the field of view 14 passes through the light-transparent portions 18a. The light-blocking portions 18b are arranged to block light of the illuminator 12 being emitted in a direction towards the image sensor 16 to avoid so called light leaks.

In the embodiment of FIG. 1, the illuminators 12 each comprise a light source 20 being a light emitting diode (LED) that is fixedly connected to a printed circuit board (PCB) 22. The illuminators 12 further comprise a reflector 24 that is provided to deflect the light of the light source 20 in the direction of the field of view 14. The reflectors 24 are connected to the PCB 22 in a way that a sealing surface is established between the reflectors 24 and the PCBs 22. For example, the PCBs 22 and/or the reflectors 24 can be coated with an elastic material so that the surface between each reflector 24 and the corresponding PCB 22 is sealed properly.

The reflectors 24 each comprise at least one inner reflecting surface 24a that defines an inner space 25. This space 25 is occupied by the light-transparent portions 18a of the optical element 18. As shown in FIG. 1, the inner circumference of the reflecting surface 24a increases towards the end opposite the light source 20. Similarly, the outer circumference of the light-transparent portion 18a of the optical element increases along the general direction the light travels from the light source 20 to the field of view 14.

The light sources 20 are encapsulated by the light-transparent portions 18a so that the light sources 20 are sealed. In the embodiment of FIG. 1, the light-transparent portions 18a each abut the respective PCB 22 along a closed shape around the light source 20. Since the light-transparent portions 18a are made from an elastic material such as silicon rubber, sealing of the light sources 20 is improved.

Each reflector 24 is positioned around one of the light sources 20. At a distal end from the light source 20, the reflector 24 abuts the light-blocking portion 18b of the optical element 18. The reflector 24 and the light-blocking portion 18b together form a shield so that light emitted by the illuminator 12 does not directly shine towards the image sensor 16. Therefore, the reflector 24 and the light-blocking portion 18b are arranged to block light of the illuminator 12 being emitted in a direction towards the image sensor 16 to avoid so called light leaks.

At the side facing the field of view 14, i.e. the front face, the device 10 is equipped with a cover 26. The cover 26 is impermeable to visible light and thus appears as a black or dark surface to a driver. The light-blocking portion 18b abuts the cover 26 so that a sealing surface is established.

When the light sources 20 emit infrared light, it passes through the light-transparent portion 18a and through the cover 26 into the field of view 14. The infrared light is reflected by an object placed in the field of view 14, such as the head of a driver, and is then detected by the image sensor 16. On the other hand, light that does not exit the device 10 and would be detected by the image sensor 16 is blocked by the light-blocking portion 18b.

Figure 2:
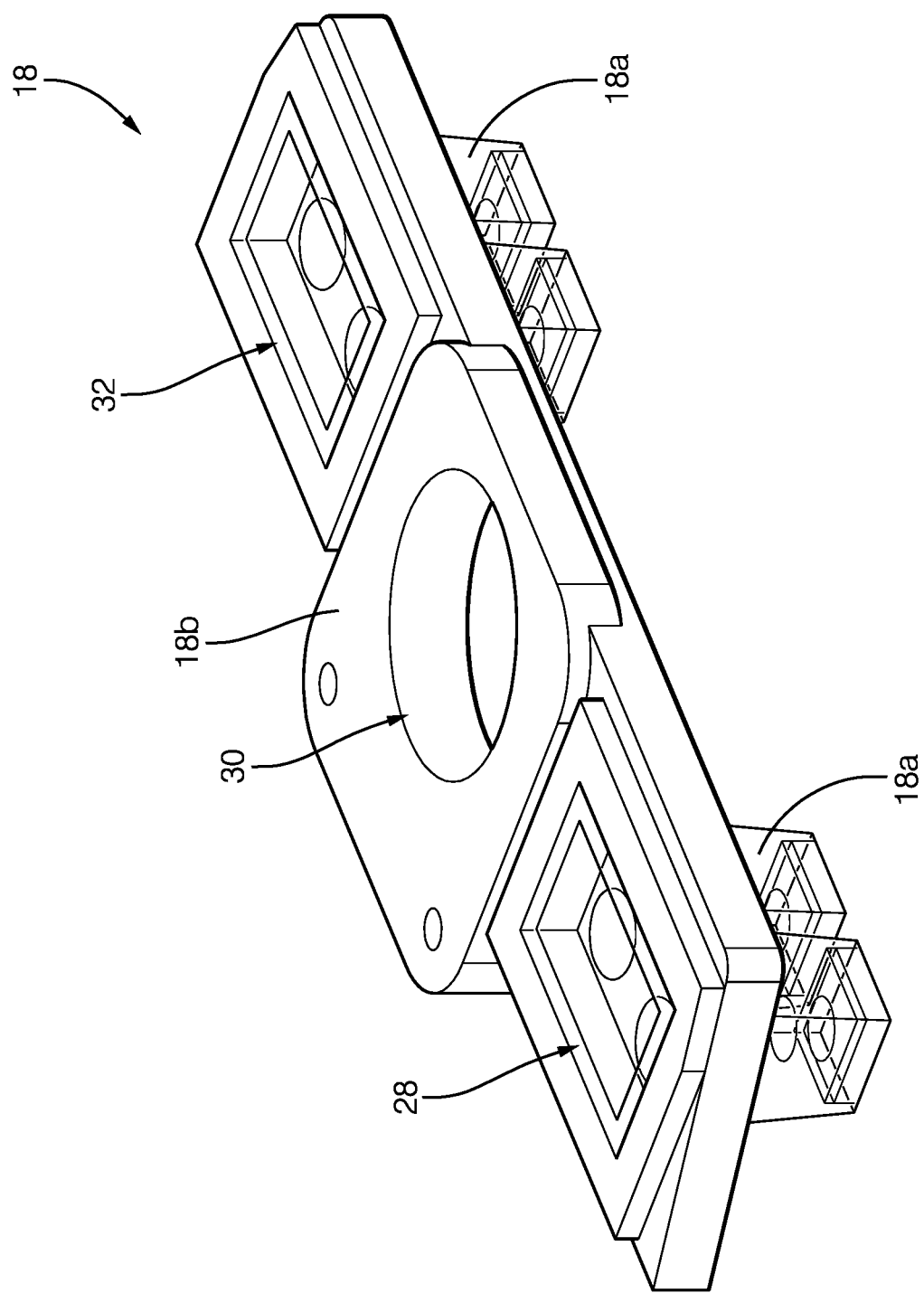
FIG. 2 shows a perspective view of an optical element according to a second embodiment of the present invention that is arranged to be used in a device as shown in FIG. 1 having a reflector.

In FIG. 2, an optical element 18 for four light-sources 20 is depicted. The optical element 18 comprises two light-transparent portions 18a and a light-blocking portion 18b connecting the two light-transparent portions 18a. Each light-transparent portion 18a is configured to receive a pair of light-sources 20. The light-blocking portion 18b forms three frames 28, 30, 32, one frame 28 for the first pair of light-sources 20, one frame 32 for the second pair of light-sources 20, and one frame 30 between the frames 28, 32 for the image sensor 16. Therefore, the light sources 20 can be arranged on at least two sides of the image sensor 16.

Figure 3:
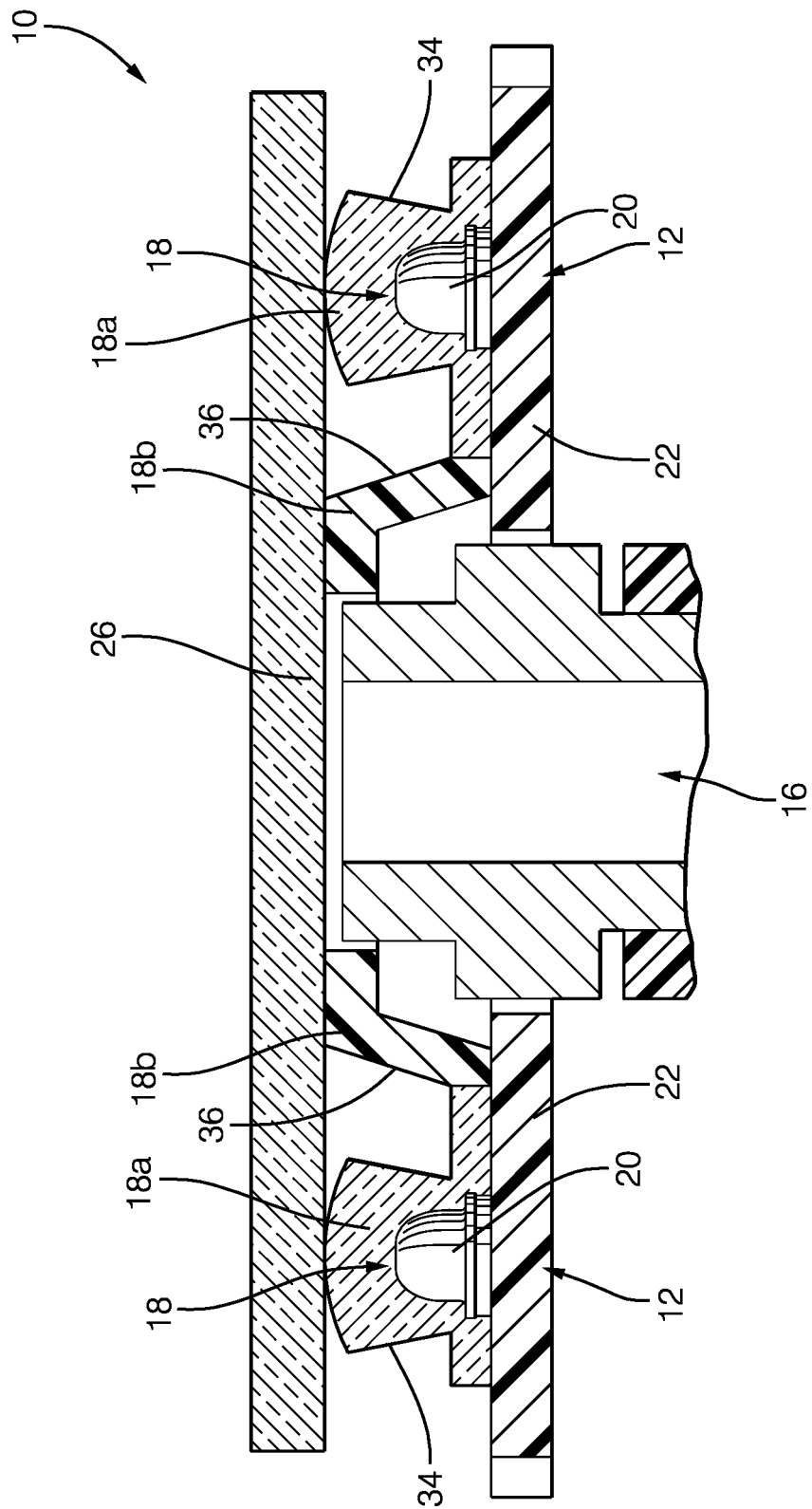
FIG. 3 shows a schematic cross sectional view of a device according to a third embodiment of the present invention not having a separate reflector part.

FIG. 3 depicts a third embodiment. This embodiment does not need a separate reflector part. The light-transparent portion 18a encompasses the light source 20 and is connected to the PCB 22 along a closed shape to seal the light source 20. The light-blocking portion 18b extends from the PCB 22 to the cover 26 in order to block light emitted from the light source 20 that would otherwise radiate directly into the image sensor 16 and therefore cause light leaks.

The light-transparent portion 18a forms a convex surface on the side where the light exits the light-transparent portion 18a. Thus, the light-transparent portion 18a forms a lens 33 in order to better define the illumination of the field of view 14. A peripheral surface 34 of the light-transparent portion 18a or a peripheral surface 36 of the light-blocking portion 18b can be coated with a reflective coating to better define illumination of the field of view 14.

The light-transparent portion 18a and the light-blocking portion 18b both abut the PCB 22 and the cover 26 to buffer vibrations of the PCB 22 and/or the cover 26. The light-transparent portion 18a and/or the light-blocking portion 18b can be fixed to the PCB 22 and/or the cover 26 to make sure that vibrations are buffered continuously.

Figure 4A:
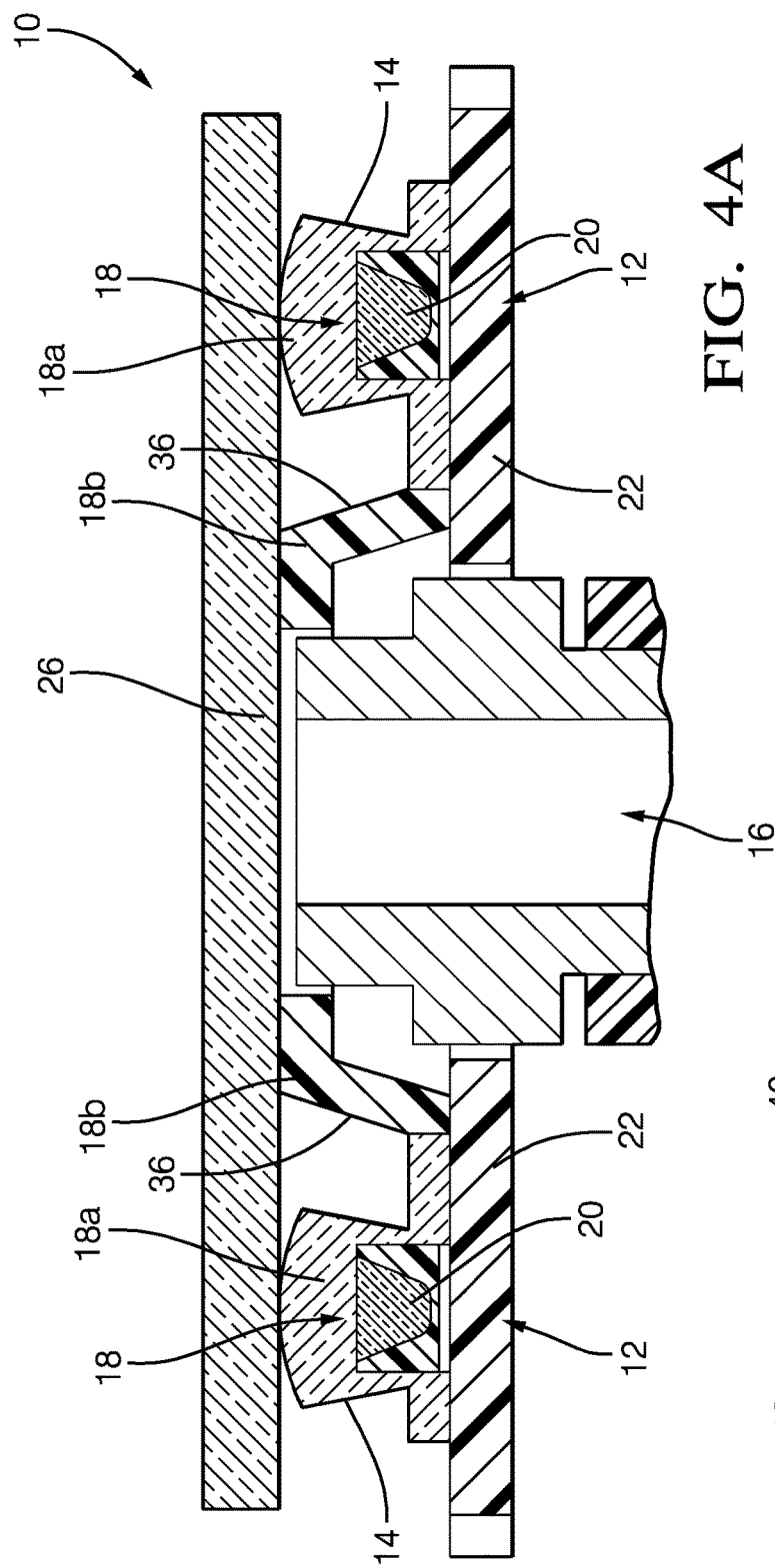
FIG. 4A shows a schematic cross sectional view of a device according to a fourth embodiment of the present invention having a reflector integrated into a SMD LED.

FIG. 4A depicts a fourth embodiment. It varies from the embodiment of FIG. 3 in that the light source 20 is a SMD (surface mounted device) LED with an integrated reflector. SMD LEDs have a longer technical lifetime and are brighter than regular LEDs.

Figure 4B:
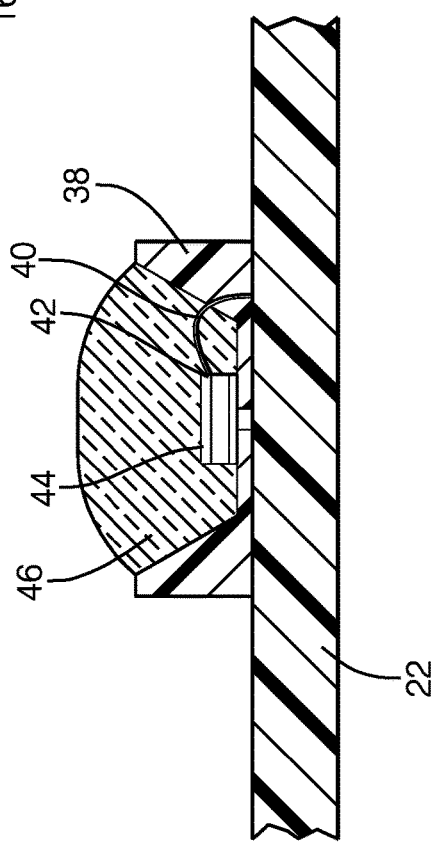
FIG. 4B shows a schematic cross sectional view of a SMD LED.

FIG. 4B shows a SMD LED as used in the fourth embodiment of FIG. 4A. The SMD LED comprises a heatsink 38 having a reflective surface 38a mounted on the printed circuit board 22. A bonding wire 40 connects the PCB 22 with a semiconductor crystal 42 that is covered by a phosphorus layer 44. The SMD LED can have an integrated lens 46 as shown in FIG. 4B. Alternatively, the SMD LED does not have an integrated lens, e.g. the SMD LED is a flat LED.

Figure 5A:
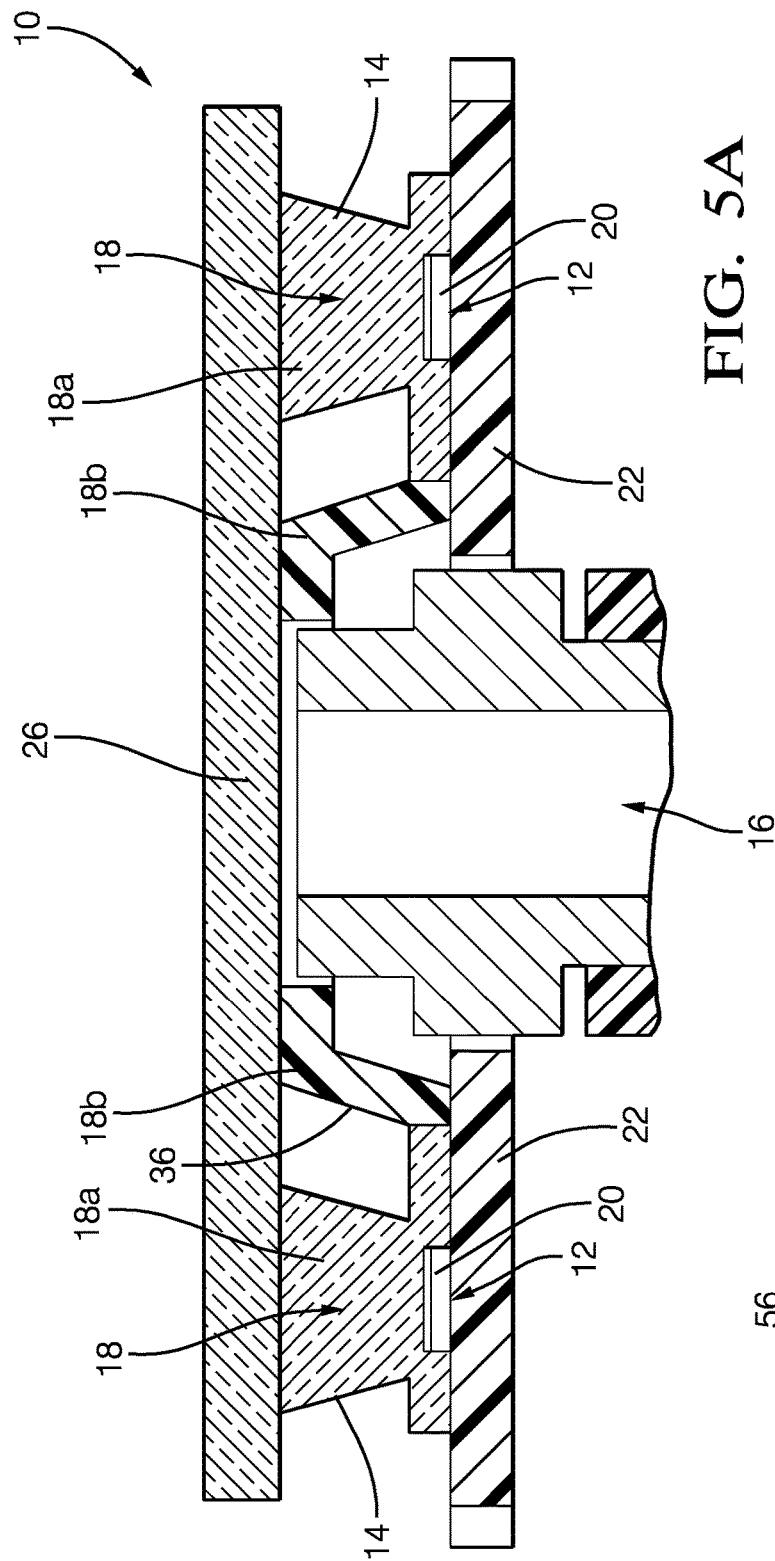
FIG. 5A shows a schematic cross sectional view of a device according to a fifth embodiment of the present invention with a COB LED and not having a separate reflector part.

FIG. 5A depicts a fifth embodiment. It varies from the embodiments of FIGS. 3 and 4 in that the light source 20 is a COB (chip on board) LED without reflector. COB LEDs can be built in a compact design and are very reliable. In this embodiment, the light-transparent portion 18a does not form a lens but instead lies flat on the cover 26.

Figure 5B:
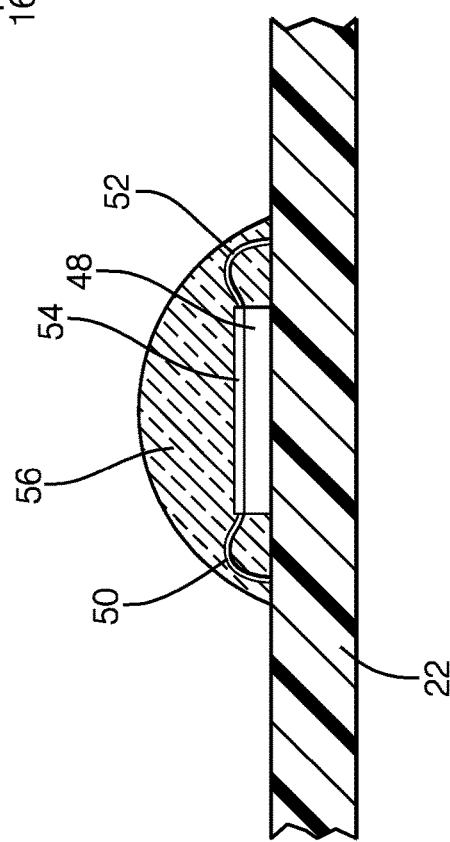
FIG. 5B shows a schematic cross sectional view of a COB LED.

FIG. 5B shows a COB LED as used in the fifth embodiment of FIG. 5A. The COB LED comprises a semiconductor crystal 48 that is mounted, e.g. glued, on a printed circuit board 22. The PCB 22 is also used for cooling of the LED. Two bonding wires 50, 52 connect the semiconductor crystal 48 to the PCB 22. The semiconductor crystal 48 is covered by a phosphorus layer 54. Then, the semiconductor crystal 48 with the phosphorus layer 54 and the two bonding wires 50, 52 are covered by a lens 56 that can be made from epoxide resin.

Figure 6:
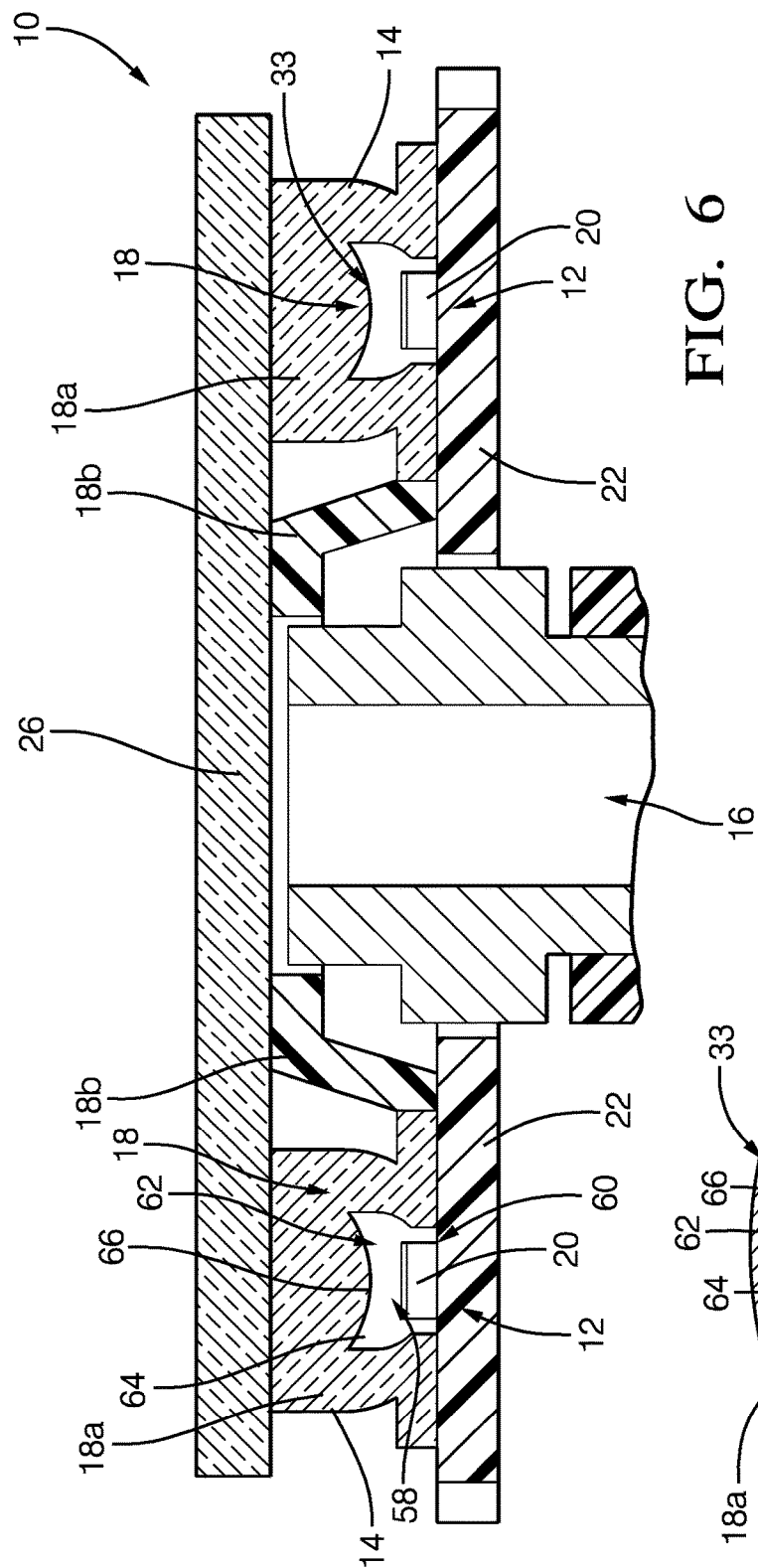
FIG. 6 shows a schematic cross sectional view of a device according to a sixth embodiment of the present invention not having a separate reflector part but having a light-transparent portion with an undercut.

FIG. 6 depicts a sixth embodiment with a special form of the light-transparent portion 18a. The light-transparent portion 18a forms a cavity 58 with an opening 60 and defines a space 62 that is partly occupied by the light source 20, e.g. a SMD LED or a COB LED. The cavity's inner circumference, the measured distance once around the inner surface at a given height, varies in that it becomes larger at a height that is further away from the light source 20. Therefore, the cavity 58 defines an undercut 64 with respect to the opening 60. In the cavity 58, on the side facing the light source 20, the light-transparent portion 18a has a convex surface 66. Thus, the light-transparent portion 18a forms a lens 33. In the opposite direction facing away from the light source 20, the light-transparent portion 18a has a surface that is flat and lies flat against the cover 26.

Figure 7:
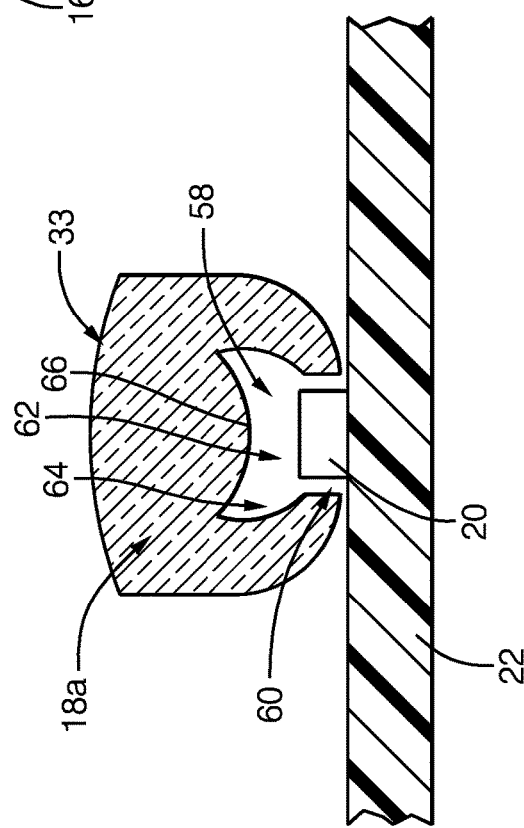
FIG. 7 shows a schematic cross sectional view of another light-transparent portion having an undercut according to a seventh embodiment of the invention.

FIG. 7 depicts a light-transparent portion 18a according to a seventh embodiment. This embodiment is similar to the light-transparent portion 18a of FIG. 6 with some exceptions that are explained in the following. The light-transparent portion 18a of FIG. 7 does not abut the PCB 22. A second, independent difference is that the light-transparent portion 18a has a surface facing away from the light source 20 that is convex and thus forms a lens 33.

Figure 8:
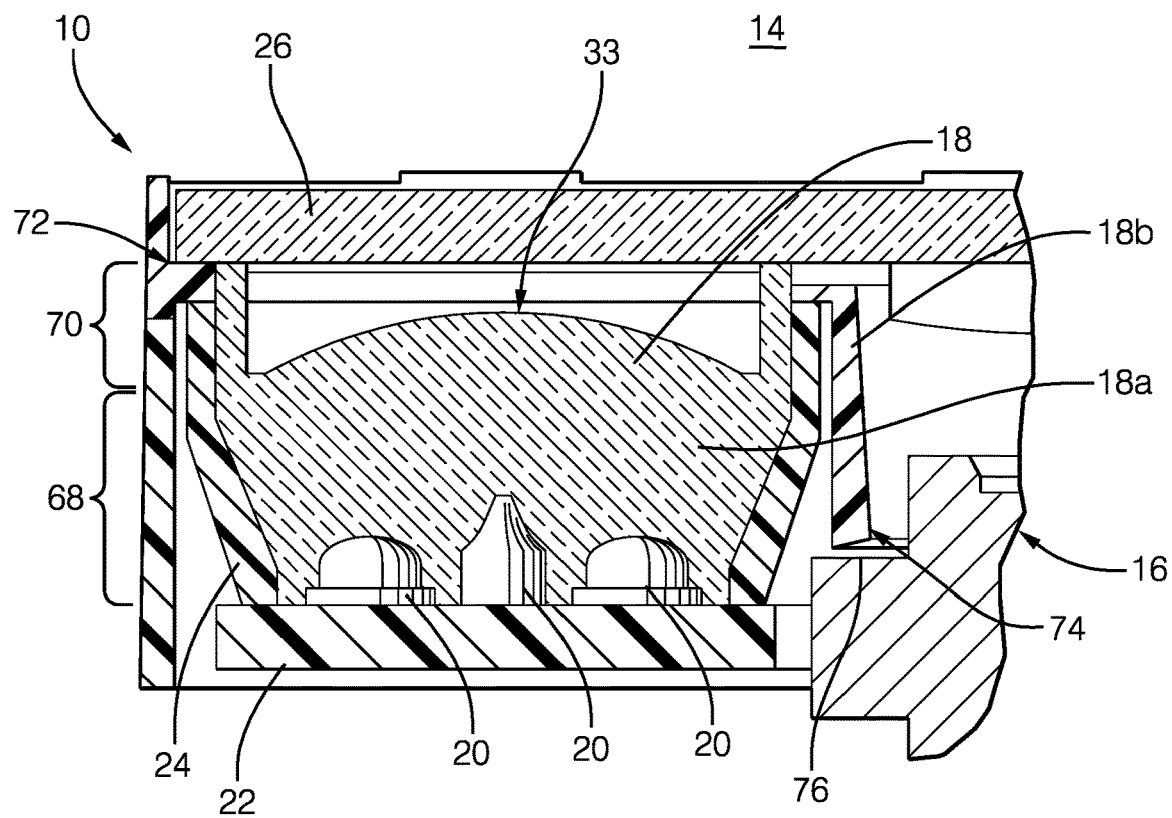
FIG. 8 shows a detailed schematic cross sectional view of a device according to an eighth embodiment of the present invention.

FIG. 8 depicts a device 10 according to an eighth embodiment. The device 10 for acquiring images inside a vehicle comprises multiple LEDs 20 to illuminate the field of view 14, an image sensor 16 that is arranged to acquire images from the field of view 14, and an optical element 18 having a light-transparent portion 18a and a light-blocking portion 18b. The light-transparent portion 18a is arranged so that light of the LEDs 20 being emitted to the field of view 14 passes through the light-transparent portion 18a. The light-blocking portion 18b is arranged between the LEDs 20 and the image sensor 16 to block light of the LEDs 20 being emitted in a direction towards the image sensor 16 to avoid so called light leaks.

In the embodiment of FIG. 8, the multiple LEDs 20 are all fixedly connected to one printed circuit board (PCB) 22. A reflector 24 is provided to reflect the light of the LEDs 20 in the direction of the field of view 14. The reflector 24 is connected, e.g. glued, to the PCB 22 in a way that a sealing surface is established between the reflector 24 and the PCB 22. Alternatively, the PCB 22 and/or the reflector 24 can be coated with an elastic material so that the surface between reflector 24 and the PCB 22 is sealed properly. Furthermore, the light-transparent portion 18a, which is made from an elastic material such as silicon rubber, abuts the PCB 22 to damp vibrations of the PCB 22.

The reflector 24 is positioned around the light-transparent portion 18a and comprises an inner reflecting surface 24a that faces towards the light-transparent portion 18a. As shown in FIG. 8, the inner circumference of the reflecting surface 24a increases in a first sector 68 and then stays constant in a second sector 70. Similarly, the outer circumference of the light-transparent portion 18a of the optical element 18 increases in the first sector 68 and stays constant in the second sector 70. As can be seen in FIG. 8, the first sector 68 is closer to the light source 20 than the second sector 70.

The LEDs 20 are encapsulated by the light-transparent portion 18a so that each LED 20 is sealed. To do so, the light-transparent portion 18a abuts the PCB 22 along a closed shape around each LED 20. Since the light-transparent portion 18a is made from an elastic material such as silicon rubber, sealing of each LED 20 is ensured.

In order to avoid vibrations of the reflector 24 to cause noise, the light-transparent portion 18a abuts the reflector 24 and therefore damps vibrations of the reflector 24. Therefore, vibrations of the reflector 24 due to vibrations of the PCB 22 or due to the photomechanical effect are successfully avoided.

The reflector 24 and the light-blocking portion 18b together form a shield so that light emitted by the LEDs 20 does not directly reach the image sensor 16, i.e. so that light emitted by the LEDs 20 does not reach the image sensor 16 without leaving the device. In other words, the reflector 24 and the light-blocking portion 18b are arranged to block light of the illuminator 12 being emitted in a direction towards the image sensor 16 to avoid so called light leaks.

At the side facing the field of view, the device 10 according to the embodiment of FIG. 8 is also equipped with a cover 26 forming the face side of the device. The cover 26 is impermeable to visible light and thus appears as a black or dark surface to the driver. The light-blocking portion 18b forms a flexible sealing lip 72 that is in contact with the cover 26 so that a sealing surface is established. The light-blocking portion 18b also forms a second flexible sealing lip 74 that is in contact with a housing 76 of the device 10 so that a second sealing surface is established.

As explained before, infrared light that is emitted from the LEDs 20 can radiate through the light-transparent portion 18a and through the cover 26 into the field of view 14. The infrared light is reflected by an object placed in the field of view 14, such as the head of a driver and is then detected by the image sensor 16. On the other hand, light that stays inside the device 10 and would usually be detected by the image sensor 16 is blocked by the light-blocking portion 18b.

As can be seen from FIG. 8, the light-transparent portion 18a forms a lens 33 on a side of the light-transparent portion 18a that faces away from the light sources 20. The lens 33 is located in the second sector 70 of the light-transparent portion 18a.

Figure 9:
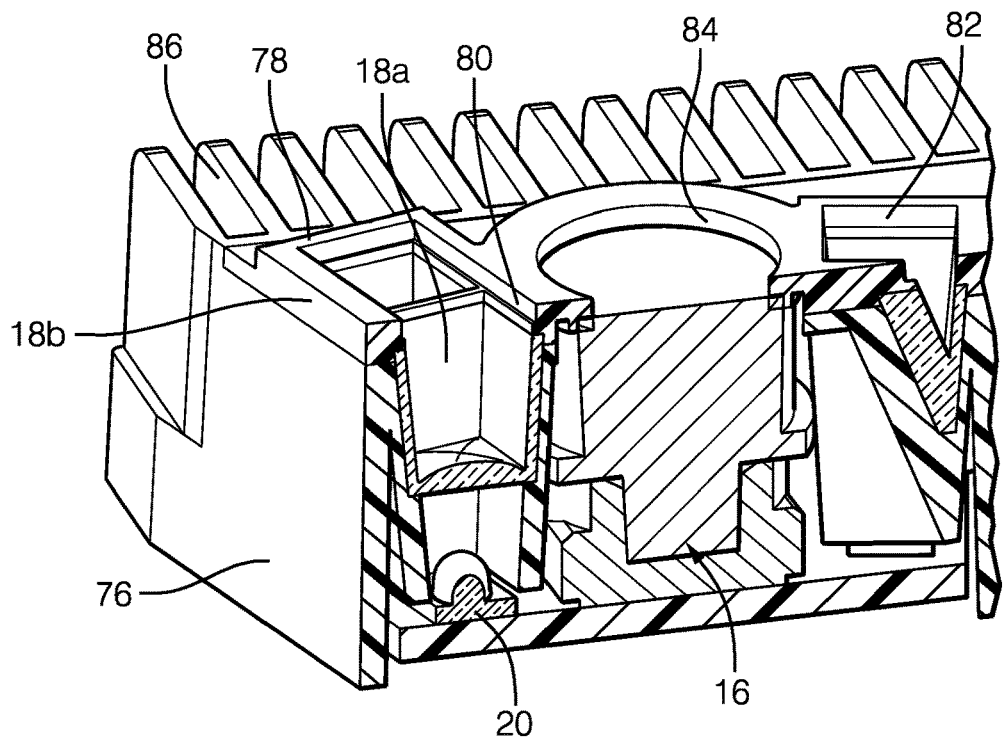
FIG. 9 shows a perspective cross sectional view of a device according to a ninth embodiment of the present invention.

In FIG. 9, it can be seen that the light-blocking portion 18b forms multiple rectangular frames 78, 80, 82 that each define an opening for light to shine into the field of view 14. The light-blocking portion 18b also forms a circular frame 84 so that light can pass through to the image sensor 16.

Figure 10:
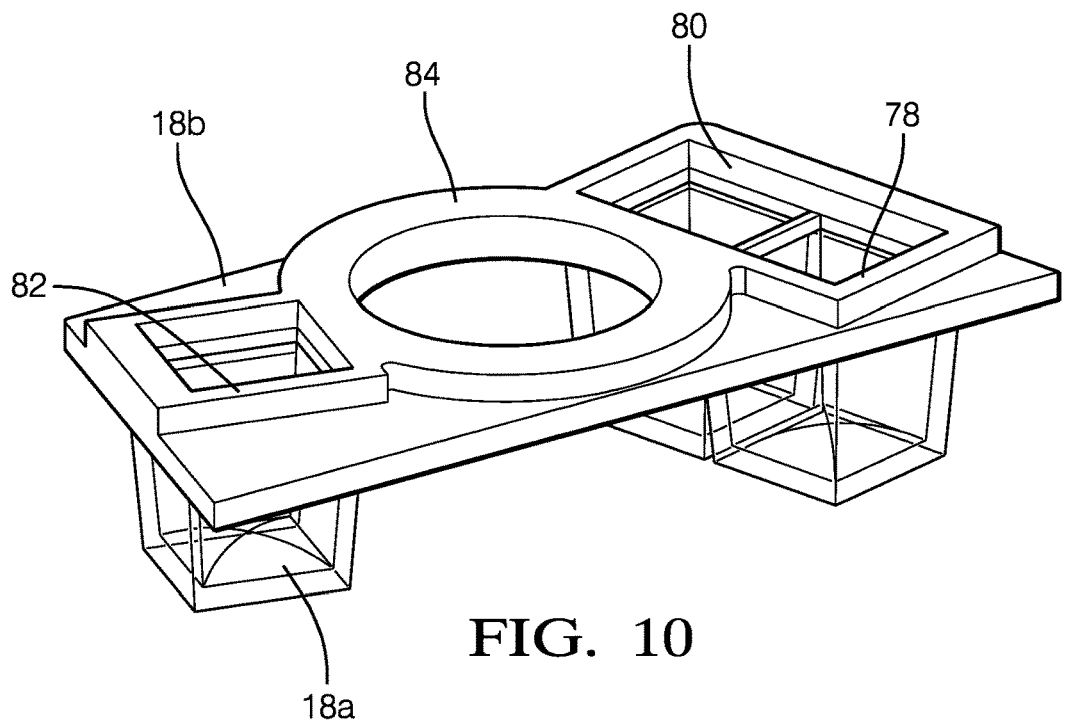
FIG. 10 shows a perspective view of an optical element according to the ninth embodiment of the present invention.

FIG. 10 shows the optical element 18 with the light-transparent portion 18a and the light-blocking portion 18b. As can be seen from this figure, the light-transparent portions 18a each have a rectangular outer form in line with the form of the frames 78, 80, and 82.

Figure 11:
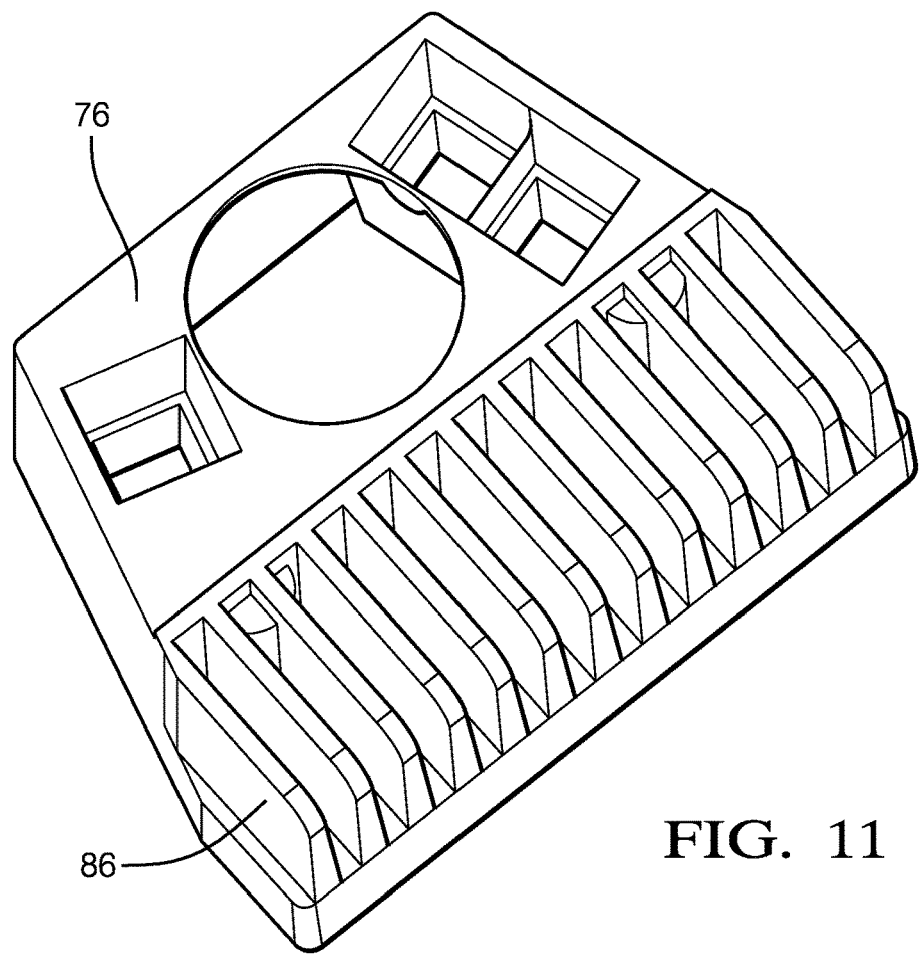
FIG. 11 shows a perspective view of a housing according to the ninth embodiment of the present invention.

FIG. 11 shows an exemplary housing for the device including a heatsink with multiple cooling fins 86 for cooling the light sources 20.

While this invention has been described in terms of the preferred embodiments thereof, it is not intended to be so limited, but rather only to the extent set forth in the claims that follow.

I claim:

1. A device for acquiring images inside a vehicle, said device comprising:
    an illuminator configured to illuminate a field of view;
    an image sensor configured to acquire images from the field of view; and
    a cover between the illuminator and the field of view;
    an optical element that abuts the cover on a side opposite the field of view, the optical element further comprising a light-transparent portion, a light-blocking portion, and a printed circuit board (PCB),
    wherein the light-transparent portion is configured so that:
        light of the illuminator emitted to the field of view passes through the light-transparent portion;
        the light-transparent portion forms a cavity with an opening and defines a space that is partially occupied by a light source;
        a side of the light-transparent portion partially forms the cavity and faces the light source to form a lens; and
        the light-transparent portion comprises a silicon rubber and further forms a sealed surface that abuts the PCB to dampen vibrations of the PCB, and
    wherein the light-blocking portion is configured to block the light of the illuminator emitted in a direction towards the image sensor.

2. The device for acquiring images inside a vehicle according to claim 1, wherein the light-transparent portion forms at least one lens.

3. The device for acquiring images inside a vehicle according to claim 1, wherein the illuminator is arranged to emit light at an infrared-range wavelength.

4. The device for acquiring images inside a vehicle according to claim 1, wherein the illuminator comprises a laser or a light emitting diode.

5. The device for acquiring images inside a vehicle according to claim 1, wherein the illuminator comprises a light source that is encapsulated by the light-transparent portion.

6. The device for acquiring images inside a vehicle according to claim 1, wherein the light-blocking portion comprises an elastic material.

7. The device for acquiring images inside a vehicle according to claim 1, wherein the light-transparent portion defines an inner space with an undercut.

8. The device for acquiring images inside a vehicle according to claim 1, wherein a surface of the light-transparent portion is at least partially coated with an anti-reflective coating or a reflective coating.

9. The device for acquiring images inside a vehicle according to claim 1, wherein the light-transparent portion has a light-entering surface with diffusing properties, a light-exiting surface with diffusing properties.

10. The device for acquiring images inside a vehicle according to claim 1, wherein the light-transparent portion comprises a material having light diffusing properties.

11. The device for acquiring images inside a vehicle according to claim 1, wherein the illuminator comprises a reflector that is provided to deflect the light of a light source in the direction of the field of view, wherein the reflector abuts at least one of the light-transparent portion or the light-blocking portion.

12. The device for acquiring images inside a vehicle according to claim 11, wherein the reflector and the light-blocking portion abut each other to form a sealing surface, wherein the sealing surface extends along a closed shape.

13. The device for acquiring images inside a vehicle according to claim 11, wherein the reflector and the light-transparent portion abut each other to form a sealing surface, wherein the sealing surface extends along a closed shape.

14. The device for acquiring images inside a vehicle according to claim 1, wherein the illuminator comprises a printed circuit board and the light-transparent portion and the printed circuit board abut each other to form a sealing surface, wherein the sealing surface extends along a closed shape.

15. The device for acquiring images inside a vehicle according to claim 1, wherein the cover is impermeable to visible light, wherein the light-blocking portion and the cover abut each other to form a sealing surface.

16. The device for acquiring images inside a vehicle according to claim 1, wherein the light-blocking portion forms at least one frame through which the light of the light source emits light to the field of view.

17. The device for acquiring images inside a vehicle according to claim 1, wherein the light-blocking portion and the light-transparent portion form a connection zone along a closed shape.

18. The device for acquiring images inside a vehicle according to claim 1, wherein the optical element comprises a single fabricated part comprising a thermoplastic material.

19. The device for acquiring images inside a vehicle according to claim 18, wherein the single fabricated part extends from the illuminator towards the cover to prevent light leaks at the image sensor, the light leaks being caused by the illuminator.

* * * * *